United States Patent

Sulzbach et al.

[11] Patent Number: 5,587,182
[45] Date of Patent: Dec. 24, 1996

[54] APPARATUS FOR THE PRODUCTION OF ENDLESS POLYURETHANE MOLDINGS

[75] Inventors: Hans-Michael Sulzbach, Königswinter; Lothar Röhrig, Neunkirchen-Seelscheid, both of Germany

[73] Assignee: Maschinenfabrik Hennecke GmbH, Leverkusen, Germany

[21] Appl. No.: 388,790

[22] Filed: Feb. 15, 1995

[30] Foreign Application Priority Data

Feb. 21, 1994 [DE] Germany ............................ 44 05 427.0

[51] Int. Cl.⁶ .............................. B29C 44/20; B01F 15/00
[52] U.S. Cl. ........................ 425/4 C; 422/133; 366/159.1; 264/45.8
[58] Field of Search ..................... 425/4 C, 4 R, 425/817 R, 817 C; 264/45.8; 422/133; 366/159.1

[56] References Cited

U.S. PATENT DOCUMENTS

| | | | |
|---|---|---|---|
| 3,174,887 | 3/1965 | Voelker | 425/4 C |
| 3,692,442 | 9/1972 | Gerbert | 425/4 R |
| 3,872,199 | 3/1975 | Ottinger | 425/4 C |
| 3,895,087 | 7/1975 | Ottinger | 264/45.8 |
| 3,960,506 | 6/1976 | Schmitzer | 366/159.1 |
| 4,128,611 | 12/1978 | Kolakowski et al. | 425/4 C |
| 4,165,187 | 8/1979 | James | 366/159.1 |
| 4,216,181 | 8/1980 | Ebeling et al. | 264/45.8 |
| 4,314,963 | 2/1982 | Boden et al. | 425/817 R |
| 4,315,726 | 2/1982 | Semerdjiev et al. | 425/817 R |
| 4,386,983 | 6/1983 | Hipchen et al. | 264/45.8 |
| 4,399,105 | 8/1983 | Tilgner et al. | 425/4 R |
| 4,497,579 | 2/1985 | Schmitz et al. | 366/159.1 |
| 4,510,120 | 4/1985 | Bauer | 366/159.1 |
| 4,571,319 | 2/1986 | Baluch et al. | 264/40.1 |
| 4,581,186 | 4/1986 | Larson | 264/45.8 |
| 4,726,933 | 2/1988 | Mayr et al. | 425/4 C |
| 5,188,845 | 2/1993 | Payne | 425/4 R |
| 5,201,580 | 4/1993 | Bauer | 366/159.1 |
| 5,270,013 | 12/1993 | Decker | 366/159.1 |
| 5,312,596 | 5/1994 | Proksa et al. | 425/131.1 |

FOREIGN PATENT DOCUMENTS

| | | | |
|---|---|---|---|
| 437727 | 7/1991 | European Pat. Off. | |
| 2146209 | 4/1973 | Germany | 425/817 R |
| 2364591 | 6/1975 | Germany | 425/817 R |
| 2739989 | 3/1978 | Germany | 425/817 R |
| 4000879 | 7/1991 | Germany | 425/4 R |
| 730592 | 4/1980 | U.S.S.R. | 425/4 R |

*Primary Examiner*—Allan R. Kuhns
*Attorney, Agent, or Firm*—Joseph C. Gil

[57] ABSTRACT

The invention is directed to an apparatus for the production of polyurethane moldings endless in one dimension using at least two alternately operated mixheads for the reactive polyurethane components. Material which has been correctly conditioned by circulation of the reactive components through the mixhead not in operation arrives at that mixhead at least before it is put into operation and the components are delivered by units which are common to the mixheads, but independent of one another in regard to "mixing" and "conditioning".

1 Claim, 3 Drawing Sheets

APPARATUS FOR THE PRODUCTION OF ENDLESS POLYURETHANE MOLDINGS

BACKGROUND OF THE INVENTION

The present invention relates to an apparatus for the production of polyurethane moldings which are endless in one dimension.

Endless polyurethane moldings are produced by continuous introduction of a reactive polyurethane mixture into continuous molds. The reactive mixture is prepared in mixheads, more particularly high-pressure mixheads, to which the components of the reactive mixture are delivered. Such mixheads typically have a mixing chamber in which the reactive components are mixed and an outlet through which the reactive mixture passes. A problem of the fully continuous operation is that deposits of reacted polyurethane mixture build up both in the mixing chamber and at the outlet of the mixhead so that production must be interrupted to clean the mixhead.

The production of polyurethanes is described in "Kunststoff-handbuch", edited by Becker/Braun, Vol. 7, "Polyurethane", 1993, pages 139–192; for mixheads, see pages 174 et seq.

Taking a mixhead with a discharge element for the reactive mixture out of operation and putting it back into operation is a complicated procedure. After the mixhead has been taken out of operation, it is important to ensure that no residues of reactive mixture are left in the mixing chamber and the outlet (or discharge element).

To this end, the supply of both reactive components to the mixhead is not stopped altogether. Instead only the supply of one component, generally the isocyanate component, is interrupted at first so that the other component, generally the polyol component, continues to flow through the mixhead and the discharge element for a certain time, so that residues of the reactive mixture are displaced from the mixhead and the discharge element (this is typically referred to as the "flush" mode).

Before the mixhead is put back into operation, it is important to ensure that the feed lines to the mixhead are free from air bubbles and that a correctly conditioned material, i.e. material with the necessary operating temperature and mixed in the correct ratios (for example polyol in the correct ratio), is present at the mixhead. To accomplish this, each component is circulated through the mixhead with the mixing chamber shut-off, the reactive components being passed through the mixhead and back to their respective storage tanks. Any air bubbles present in the feed lines are removed in this way and the material correctly conditioned by stirring and temperature control in the storage tank is passed continuously by the mixhead (this is typically referred to as the "conditioning" mode).

To avoid interruptions in operation for cleaning, repairing and replacing parts, it would be possible in principle to operate two mixheads alternately, each of the mixheads being equipped with separate, independent feed lines, pumps and control elements. The problem addressed by the present invention was to reduce the major complications this would involve and, in particular, to allow already existing equipment with only limited space for the fitting of additional units to be interchangeably equipped for the continuous operation of two mixheads alternately.

One solution to the above noted problem (i.e. to avoid interruptions in production during the cleaning and maintenance of the mixhead) has been proposed in published European Application 437,727. This reference describes providing two mixheads operated alternately, with both mixheads being charged by a common metering pump and with the components delivered first being passed for "conditioning" through the mixhead not in operation and then being delivered to the mixhead in operation through a permanently open connecting line between the two mixheads. Unfortunately, this proposal has the disadvantage that the direction of flow of the particular component in the permanently open connecting line must be reversed whenever operation is switched from one mixhead to the other which gives rise to pressure variations leading to metering variations in the mixing chamber. In addition, the mixhead in the "condition" mode cannot be dismantled because it is tied by the permanently open connecting line. Accordingly, full maintenance or replacement of mixhead elements during production, is not possible. A more serious disadvantage is that, during the "flush" mode with the polyol component, the formulation at the mixhead in the "mix" mode is no longer correct at all, so that satisfactory production is no longer possible.

DESCRIPTION OF THE INVENTION

Figure 1:
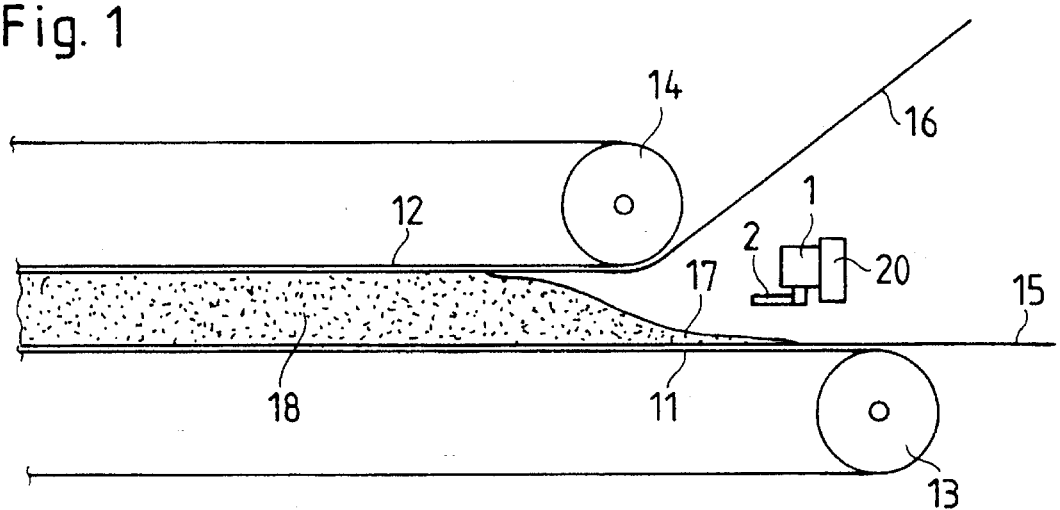
FIGS. 1 and 2 are a schematized side elevation and plan view of an apparatus for the production of laminated rigid polyurethane foam sheets.

According to the present invention, the component stream required for flushing and conditioning is pumped by an independent "conditioning pump". The conditioning pump may be far lower in its output than the "metering pump" for delivery of the components into the mixing chamber. More particularly, the conditioning pump is an inexpensive pump which need not be calibrated.

Accordingly, the present invention is directed to an apparatus for the production of polyurethane moldings endless in one dimension, comprising a continuous mold and
a) at least two alternately operated mixheads for the polyurethane reactive components which comprise changeover valves for the "mix" and "condition" or "flush" modes,
b) a common metering pump per component with a feed line to each mixhead,
c) a common conditioning pump per component with a feed line to each mixhead,
d) change-over valves between the feed lines from the metering pump and the conditioning pump at the component entrance of each mixhead, the entrance being connected to the feed line from the metering pump in the "mix" mode and to the feed line from the conditioning pump in the "flush" mode, and
e) a return line per component and mixhead which is active in the "condition" mode.

More particularly, the present invention is directed to an apparatus for the production of endless polyurethane moldings from at least two reaction components comprising:
A) storage containers for each reaction component,
B) a continuously moving mold,
C) at least two alternately operated mixheads, each of said mixheads comprising:
1) an inlet opening, 2) a mixing chamber in which said reaction components are mixed, 3) a first outlet through which a mixture of said reaction components passes from said mixing chamber, 4) a second outlet through which a reaction component passes, 5) a changeover valve which allows reaction component to either i) enter said inlet opening, enter said mixing chamber and pass through said first outlet, or ii) enter said inlet-opening and pass through said second outlet, E) a first feed line leading from a storage container to a metering pump, F) a second feed line leading from a storage container to a conditioning pump, G) feed lines leading from said metering pump to each of the inlet openings of each of said mixheads, H) feed lines leading from said conditioning pump to each of the inlet openings of each of said mixheads, I) feed lines leading from each of said second outlets to a storage container.

In a preferred embodiment, the feed and return lines to each mixhead contain shut-off valves so that the mixhead which is not in the "mix" mode can be dismantled and serviced or replaced after closure of the shut-off valves.

In the context of the present invention, the "mix" mode means that the components are pumped by the metering pumps into the mixing chamber of the mixhead in the quantity ratio prescribed by the formulation.

The "condition" mode means that the components are circulated through the mixhead without entering the mixing chamber so that material with the correct operating temperature and the correct mixing ratios between the principal and added components arrives at the mixhead at least at the moment of change-over from one mixhead to the other.

"Components" and "reactive components" are understood to be the principal components of the polyurethane polyaddition reaction, namely polyol on the one hand and isocyanate on the other hand, with other constituents, such as catalysts, fillers, modifying agents, and the like, being incorporated in these principal components. However, the additional constituents could also be separately delivered to the mixing chamber.

Another preferred embodiment is characterized by the provision of means which enable the mixhead not in operation to be moved from the production position into a position in which it is readily accessible for cleaning and optionally dismantling.

The present invention also relates to a process for the continuous production of polyurethane moldings endless in one dimension using at least two alternately operated mixheads for the reactive polyurethane components, material which has been correctly conditioned by circulation of the reactive components through the mixhead not in operation arriving at that mixhead at least before it is put into operation and the mixhead in question being flushed with only one component, generally the polyol component, after being taken out of operation, characterized in that the components are delivered by units which are common to the mixheads, but independent of one another in regard to "mixing" and "conditioning".

The polyurethane moldings endless in one dimension which can be produced in accordance with the invention may be solid or foam sheets, pipes or profiles. The endless molds used are generally conveyor belts between which the polyurethane mixture is introduced and of which the length and circulation rate are gauged in such a way that the residence time of the reactive mixture between the conveyor belts is sufficient to cure the reactive mixture. The conveyor belts may optionally be provided with structural elements which enable the moldings to be profiled. The moldings may also be profiled by simultaneous introduction of the laminating material between the conveyor belts. Arrangements of this type are known in principle, see for example DE-B 1,266,485, DE-A 1,778,407 and DE-A 2,449,044.

FIG. 1 shows a mixhead 1 with a discharge element 2 which is fixed to a bridge 20. The reactive polyurethane mixture 17 is sprayed from the discharge element 2 onto the lower laminating film 15. The laminating film 15 is arranged on the lower conveyor belt 11 of which the right-hand reversing roller 13 is shown. At the same time, the upper laminating film 16 is introduced below the upper conveyor belt 12 to which the reversing roller 14 is associated. The reactive mixture 17 foams in the gap between the two conveyor belts 11 and 12 and forms the foam sheet 18.

Figure 2:
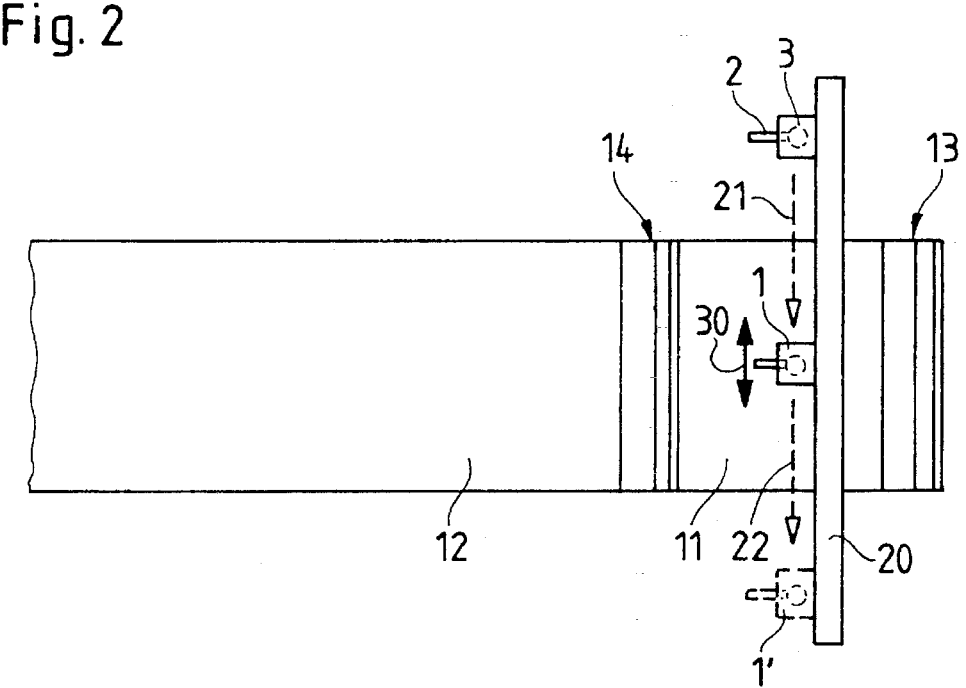

FIG. 2 is a plan view of the arrangement shown in FIG. 1, the laminating films 15 and 16 not being shown. The same reference numerals denote the same elements. The mixhead 1 in operation is reciprocated by suitable means in the bridge 20, as indicated by the arrow 30, to cover the width of the conveyor belt 11 with reactive mixture. A second, inoperative mixhead 3 is arranged on the bridge 20 in a position in which it can be cleaned or serviced. At the end of the operating time of the mixhead 1 (operation impaired by adhering reacted polyurethane mixture), the mixhead 3 is first moved alongside the mixhead 1 in the direction of arrow 21, the component supply is switched from the mixhead 1 to the mixhead 3 and the mixhead 1 is moved into position 1' where it can be cleaned and, if necessary, dismantled.

Figure 3:
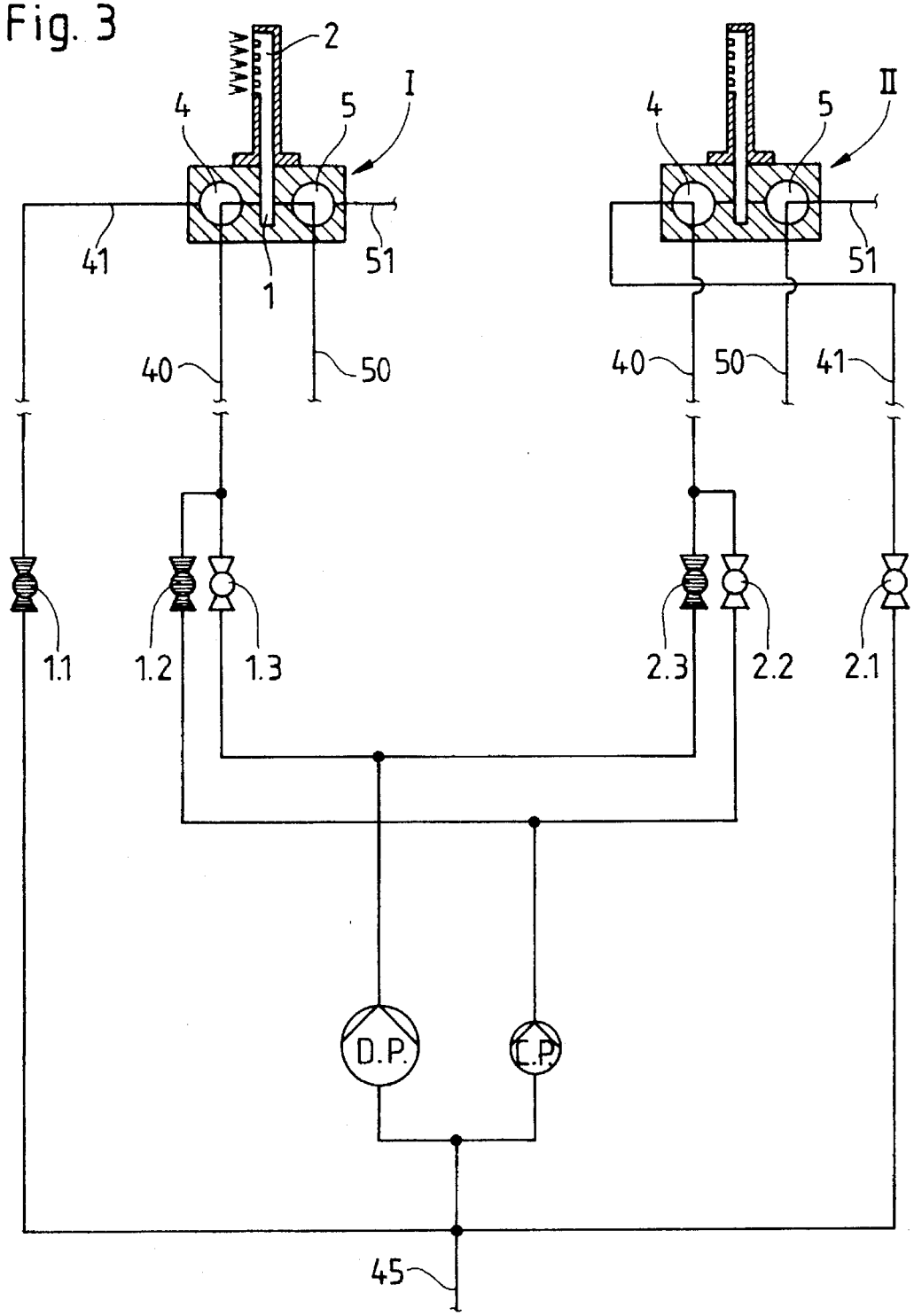
FIGS. 3 and 4 show various operational modes for the supply of components to the mixheads.

FIG. 3 shows two typical mixheads I and II, the mixhead I being in the "mix" mode and the mixhead II in the "condition" mode. The mixhead I shown by way of example comprises a mixing chamber 1 and a mixhead outlet 2. Feed lines 40 and 50 and return lines 41 and 51 for the two components are also provided. Three-way change-over elements 4 and 5 are integrated into the mixhead. FIG. 3 only shows pipes and pumps for one component, for example the polyol component. In the "mix" mode, the component is delivered to the mixing chamber 1 through the valve 1.3 and the change-over element 4. The return lines 41 and 51 are closed.

The mixhead II is in the "condition" mode. In this mode, the change-over elements 4 and 5 shut off the mixing chamber I and the outlet 2 and connect the feed lines 40 and 50 to the return lines 41 and 51. The valve 2.3 from the metering pump D.P. is closed. Valves 2.2 and 2.1 are open. The components are delivered by the conditioning pump C.P. through the mixhead without entering the mixing chamber. According to the invention, a common metering pump for each component is provided for both mixheads I and II and delivers from a storage tank (not shown) for the particular component through the line 45. The particular line, pump and valve configuration is shown for only one component, for example the polyol component, with the feed line 40 and the return line 41. A corresponding configuration is provided for the isocyanate component which is delivered through the line 50.

According to the invention, a conditioning pump C.P. which also delivers from the storage tank is provided in addition to the metering pump D.P.; valves 1.2 and 1.3 and 2.2 and 2.3 belonging to each mixhead are also provided. The valves are set up in such a way that, during the "mix"

mode, the metering pump delivers to the mixhead (mixhead I) and, during the "condition" phase, the conditioning pump delivers to the mixhead (mixhead II). In addition, the return line is active through the valve 1.1 or 2.1 during conditioning so that the component supply is returned to the metering tank or into the feed line 45 to the pumps.

Figure 4:
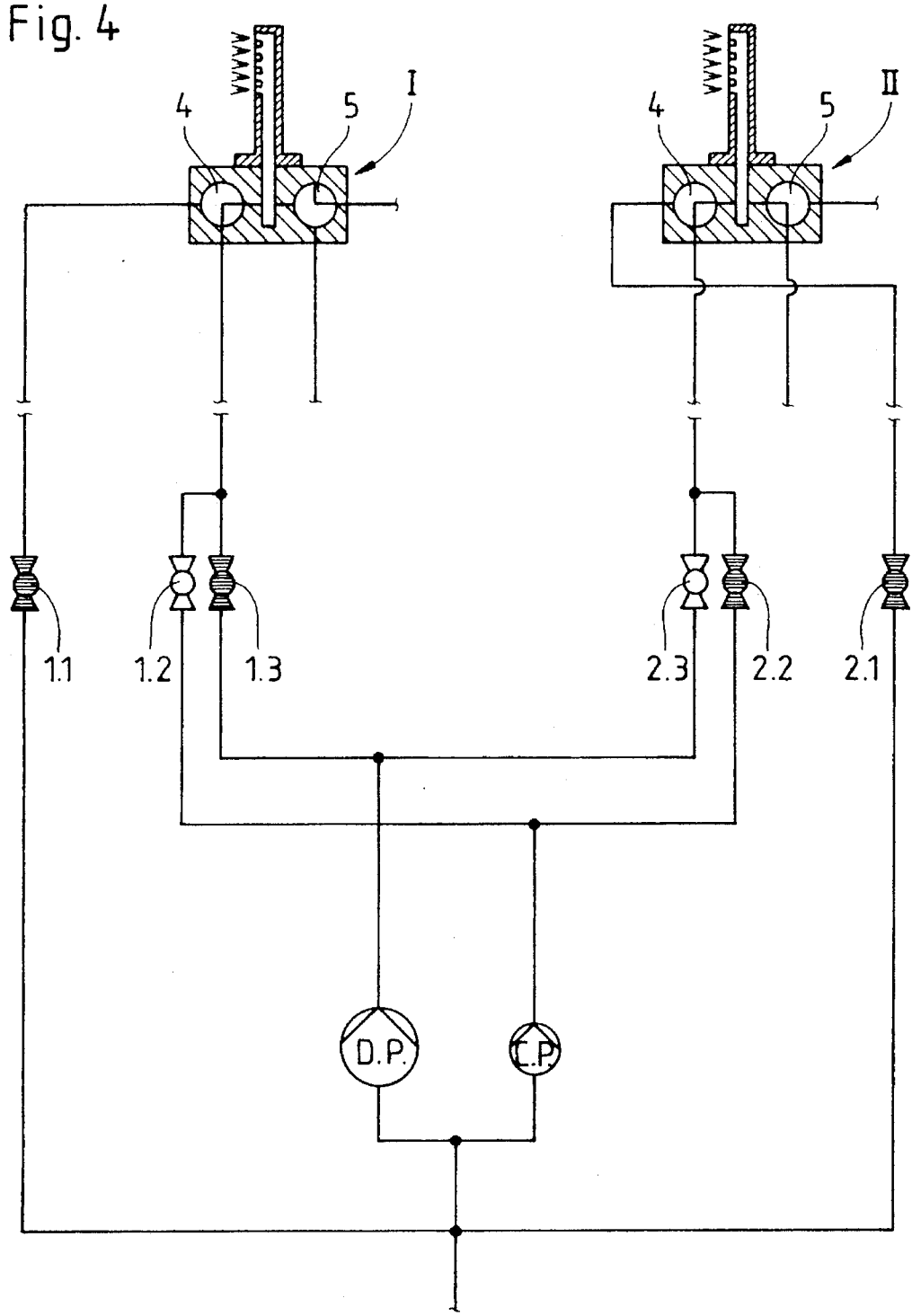

When the mixhead I has to be cleaned after a certain period in operation, it is switched to the "flush" mode by closure of the valve 1.3, opening of the valve 1.2 and shutting-off of the feed line 50 for the other reactive component through actuation of the change-over element 5 while the mixhead II is switched to the "mix" mode by actuation of the changeover elements 4 and 5, opening of the valve 2.3 and closure of the valves 2.1 and 2.2. The mode thus established is shown in FIG. 4.

After residues of the reactive mixture have been removed from the mixing chamber and the discharge element by flushing with the polyol component, the mixhead I can be dismantled and serviced after closure of the valve 1.2 and/or stoppage of the conditioning pump C.P.

The mixhead I may now even be completely replaced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of endless polyurethane moldings from at least two reaction components comprising:

A) storage containers for each reaction component,
B) a continuously moving mold,
C) at least two alternately operated mixheads, each of said mixheads comprising:
  1) an inlet opening,
  2) a mixing chamber in which said reaction components are mixed,
  3) a first outlet through which a mixture of said reaction components passes from said mixing chamber,
  4) a second outlet through which a reaction component passes,
  5) a changeover valve which allows reaction component to either
    i) enter said inlet opening, enter said mixing chamber and pass through said first outlet, or
    ii) enter said inlet opening and pass through said second outlet,
E) a first feed line leading from a storage container to a metering pump,
F) a second feed line leading from a storage container to a conditioning pump,
G) feed lines leading from said metering pump to each of the inlet openings of each of said mixheads,
H) feed lines leading from said conditioning pump to each of the inlet openings of each of said mixheads,
I) feed lines leading from each of said second outlets to a storage container.

* * * * *